Nov. 20, 1934.    A. H. LOUGHEAD    1,981,237
MULTIMOTORED AIRPLANE
Original Filed Dec. 8, 1930    3 Sheets-Sheet 1
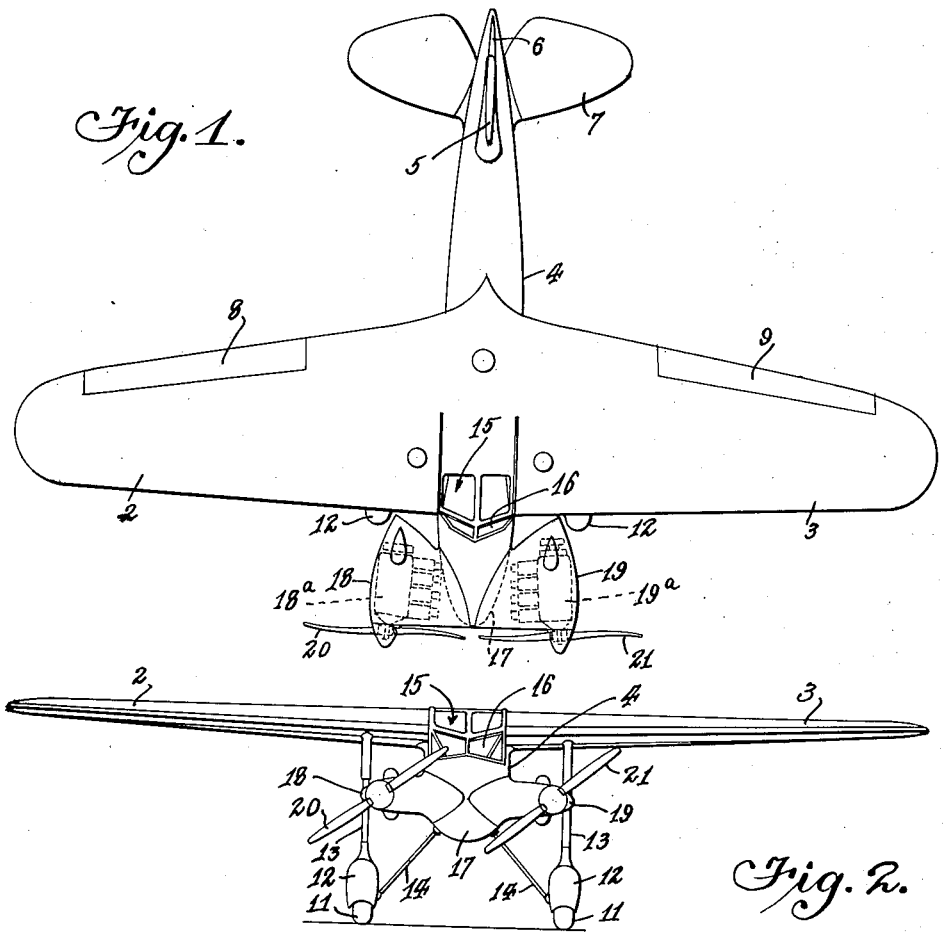
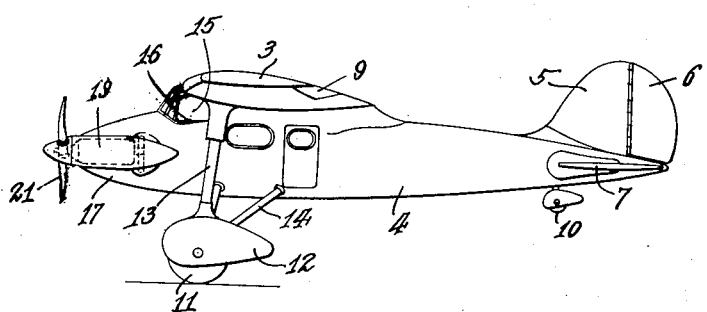

Nov. 20, 1934.  A. H. LOUGHEAD  1,981,237
MULTIMOTORED AIRPLANE
Original Filed Dec. 8, 1930   3 Sheets-Sheet 2
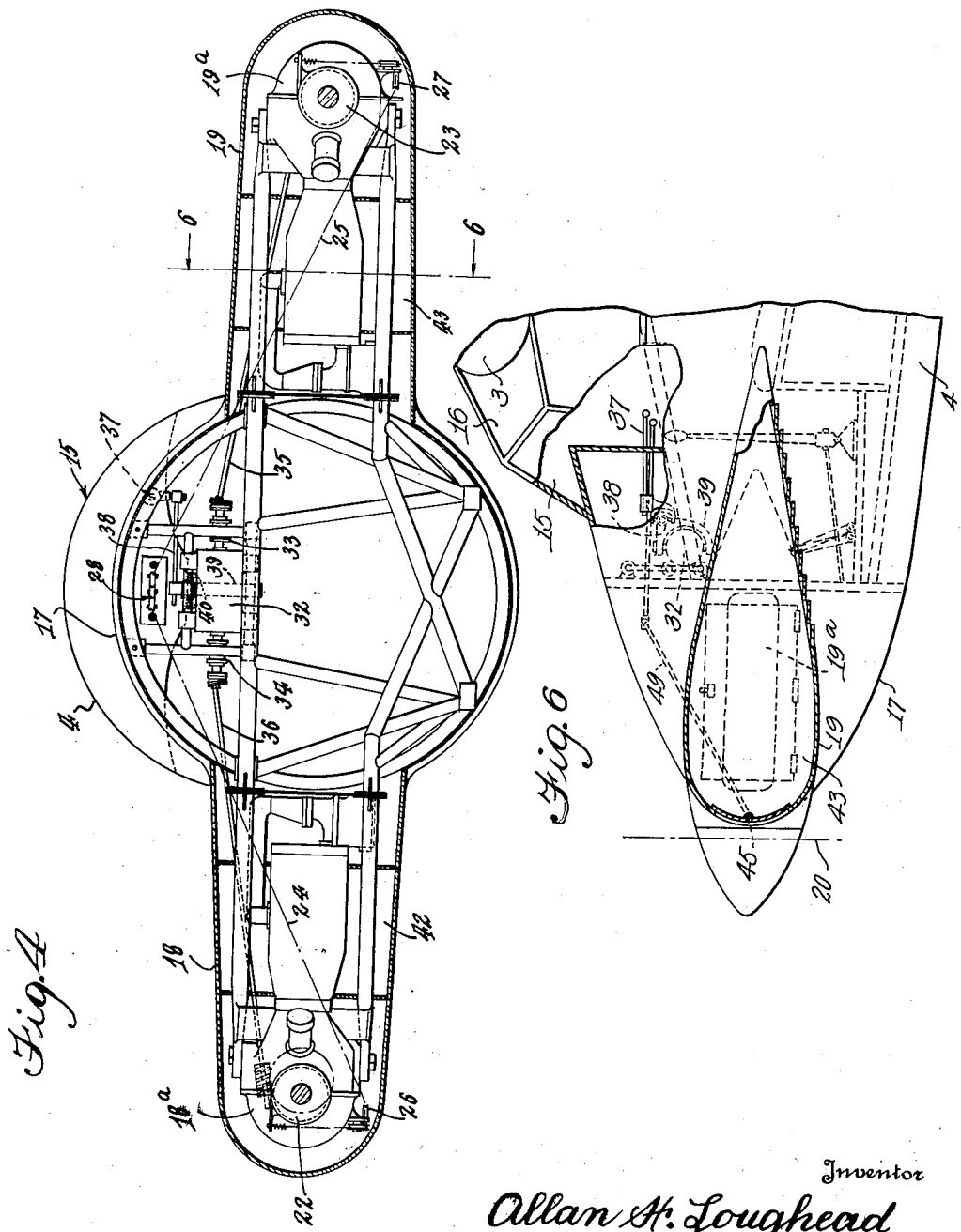
Inventor
Allan H. Loughead
By Lyon & Lyon
Attorneys

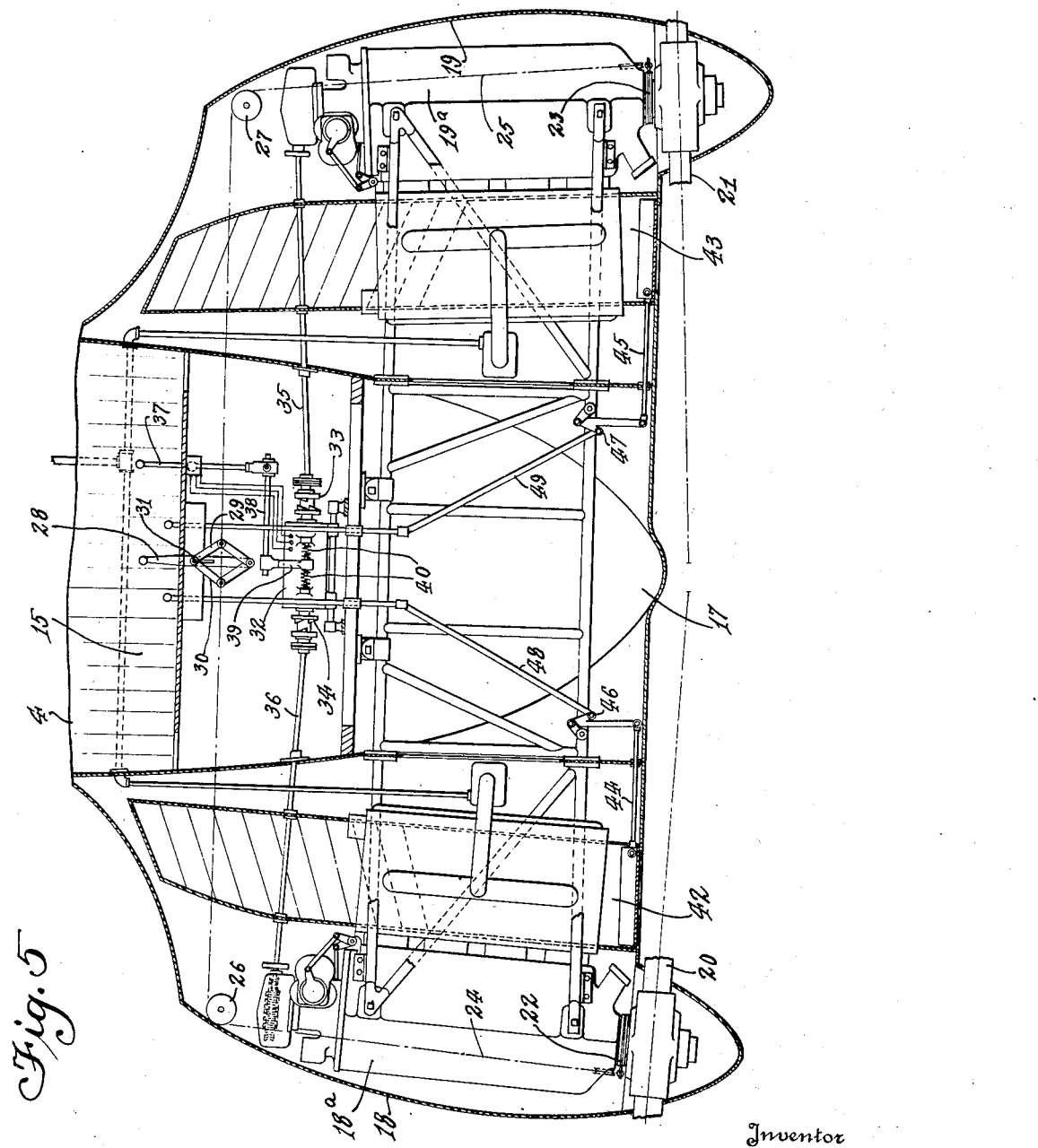

Patented Nov. 20, 1934

1,981,237

UNITED STATES PATENT OFFICE 1,981,237

MULTIMOTORED AIRPLANE

Allan H. Loughead, Los Angeles, Calif., assignor to Alhambra Airport and Air Transport Company, Denver, Colo.

Application December 8, 1930, Serial No. 500,811
Renewed December 16, 1932

6 Claims. (Cl. 244—14)

This invention relates to a multimotored airplane.

Heretofore airplanes have been driven and propelled by one or more motors. When an aircraft is propelled by a single motor, the failure of the motor to continue to operate necessitates the immediate landing of the aircraft. This renders the use of such aircraft extremely dangerous over territory where the aircraft cannot be immediately landed and moreover there is constant danger in taking off with such an aircraft as the motor may fail at a time when the aircraft is not in position to make a proper landing.

The multimotored airplanes which have heretofore been designed are all very greatly less efficient than the single motored airplanes. The same horse power in a multimotored aircraft of the present designs possesses about sixty per cent of the efficiency of a single motored airplane.

Particularly the art has had difficulty in designing an efficient two motored airplane and so constructing the airplane that the plane is efficient in flight and still capable of flight with one only of the two motors operating.

It is a general object of the present invention to provide an airplane with a plurality of motors so arranged and mounted that the aircraft possesses an efficiency comparable to that of an aircraft having a single motor while providing an aircraft which is arranged to fly efficiently with one only of the motors of the aircraft in operation.

Another object of the present invention is to provide an efficient two motored airplane in which the motors are so arranged as to have an efficiency substantially equal or superior to that of a single motored airplane and so construct the airplane and arrange the motors that the airplane may be operated with one only of the motors in operation.

A further object of the present invention is to provide an airplane in which a plurality of motors are utilized and in which the motors are arranged so that they are accessible for service during flight without requiring the mechanic to leave the cabin of the airplane.

A further object of the present invention is to provide an airplane with an arrangement of motors and driving means which will leave the vision of the pilot unimpaired and in which the motors are so arranged that the possibility of oil or like material being thrown from the motor or motors upon the windshield in front of the pilot is eliminated.

A further object of the present invention is to provide an aircraft in which a plurality of motors are utilized and arranged so as to eliminate danger to the pilots of the motors coming back against the pilots in case of a crash or noseover of the airplane.

A further object of the present invention is to provide an aircraft with a plurality of motors so arranged with reference to the pilot's position that the controls to the motors may be simplified and reduced in weight over the controls now in use, and to provide an airplane in which both motors may be operated with a single starter and in which motors may be provided with a common means or mechanism for de-clutching the propeller of either motor.

The present invention, together with further objects and advantages thereof, will best be understood from a description of the preferred form or example of an aircraft embodying the invention.

For this purpose, a preferred form of aircraft embodying the invention, is described with reference to the accompanying drawings, in which Figure 1 is a plan view;
Figure 2 is a front elevation;
Figure 3 is a side elevation;
Figure 4 is a fragmentary enlarged elevation of the nose of the cabin partially in section;
Figure 5 is a fragmentary horizontal section taken through the nose of the cabin and motor mountings showing the control for the motors; and
Figure 6 is a vertical section on line 6—6 of Figure 4.

Referring to the drawings, the aircraft is preferably of the monoplane type and 2 and 3 indicate the wings of the aircraft which are secured to a stream lined body or cabin 4. At the rear end of the body or cabin there is provided a stabilizer fin 5, a rudder 6 and a flipper 7 of any usual or preferred form for controlling the course of the aircraft. The wings 2 and 3 are provided with suitable ailerons 8 and 9 which may be operated or controlled in any usual or preferred manner.

The aircraft is provided with a rear wheel or skid 10 and with front wheels 11 preferably enclosed in stream lined housings 12 and connected with the wings by vertical standards 13. There is also preferably utilized brace rods 14 between the wheel carriages and the body 4 of the airplane.

The body 4 of the aircraft preferably is provided with a pilot chamber or cockpit 15 located just under the wings and having a windshield 16.

The body 4 has a nose 17 extending out in front of the forward or leading edges of the wings 2 and 3 a substantial distance and there the body mounts a pair of laterally disposed motor housings 18 and 19. The motor housings of duplicate construction are stream lined and open into the nose 17 of the body 4. The motor housings 18 and 19 are preferably disposed entirely in front of the forward edges of the wings 2 and 3. By disposing the motor housings entirely in front of the wings 2 and 3, the air flow by the motor housings is brought together to the rear of the motors in front of the wings so that a smooth air flow by the wings is secured.

One of the principal disadvantages of the multimotored aircrafts heretofore designed has resided in the fact that the flow of air to the wings or a portion of the wings has been interfered with too greatly by the motors and their housings and the position of the motors and their housings has prevented a smooth air flow against the wings of the aircraft. Generally the motors have been mounted in multimotored airplanes by or from the wings themselves and accordingly the motors and their housings have lain under or over the wings and the smooth flow of air by the wings is thereby interfered with. For this reason, the efficiency of the airplane is greatly reduced.

Attempts have been made to support the motors sufficiently in advance of the wings so as to eliminate this interference with air flow but the structures and bracings necessary for this purpose is so great as to itself seriously impair the efficiency of the aircraft by offering a resistance to the proper air flow.

The motors 18 and 19 mount propellers 20 and 21 respectively, preferably at a slight angle being turned out to about 3° from the longitudinal axis of the aircraft. The propellers of these motors are disposed just in front of the end of the nose 17 of the body 4 of the aircraft and are brought close together as indicated, particularly in Figure 1. The motor housings 18 and 19 are below at the sides of the pilot chamber or cockpit 15 and therefore the motors and their housings do not interfere with the clear vision of the pilot through the windshield 16.

The motors 18 and 19 and propellers 20 and 21, being disposed close together and in front of the wings 2 and 3, are in position so that either the motor 18 or 19 may be utilized solely for the purpose of driving the airplane without exerting upon the airplane any great couple tending to rotate the aircraft to one side.

One of the greatest difficulties experienced in attempting to operate a multimotored aircraft by one only of its engines, arises from the drag of the inoperative motor and its propeller. When one of the motors is inoperative and the other attempts to operate the aircraft, not only is there a force imposed by the operating motor tending to pull one side of the airplane forward, but the propeller of the inoperative motor imposes a tremendous drag to its side of the aircraft and the flying efficiency of the aircraft is thus tremendously reduced thru the necessity of counteracting this coupling force by proper utilization of the rudder and other controls.

The arrangement of motors and mountings of the present invention permits of a simple arrangement of devices proper for de-clutching the propellers of either or both motors when desired. By de-clutching the propellers of the dead or inoperative motor, approximately sixty or seventy per cent of the drag is thereby eliminated.

Now referring more particularly to Figures 4, 5 and 6, apparatus for de-clutching the propellers of the motors and their controls therefor, are indicated partially in diagrammatic form. Between the engine shaft and propellers 20 and 21 are provided clutches 22 and 23 respectively. These clutches are respectively connected within the motor housings with operating means such as cables 24 and 25 leading over pulleys 26 and 27 respectively and connected to a common operating lever 28. The common operating lever 28 is disposed within the pilot chamber 15 and is arranged so that by different motions thereof, either clutch 22 or 23 may be released, or both may be released simultaneously if desired.

For this purpose the lever 28 is connected with the lines 24 and 25 respectively by the toggle links 29 and 30 connected to a common pin 31 slidable in the slot in the lever 28. When the lever 28 is moved to the right, as viewed in Figure 5, the propeller 23 on the right hand motor will be de-clutched from the engine shaft. When the lever 28 is moved to the left the clutch 22 will de-clutch the left hand propeller from the engine shaft. Moreover, both motors may be de-clutched simultaneously by a vertical motion of the lever 28.

There are also provided within the nose of the cabin 4 of the aircraft a common starting motor 32 and clutches 33 and 34 which respectively connect the starting motor with shafts 35 and 36, respectively, leading to the motors 18 and 19, respectively. A common operating means for the clutches 33 and 34 is provided by an operating lever 37 connected by a rod 38 to a shifting member 39 normally held in the central position by springs 40. The operating lever 37 operates a switch which when moved in either direction will apply power to the motor 32 through the lines 41. By this construction either motor may be started or stopped from within the cabin 15 of the airplane and a single starting motor only is required for this purpose.

The aircraft also is preferably provided with suitable air scoops 42 and 43, respectively, at the front of the motor housings to control the supply of air which passes the motors 18a and 19a for cooling the same. These air scoops 42 and 43 are respectively connected by links 44 and 45 with rocker arms 46 and 47 to operating levers 48 and 49, respectively, the mentioned operating levers having handles within the control cabin of the aircraft.

While the particular form of airplane which has been herein described is well adapted to carry out the objects of the invention, it is to be understood that various modifications and changes may be made without departing from the present invention, and the invention includes all such modifications and changes as come within the scope of the appended claims.

I claim:

1. An airplane comprising a body and wing structure contiguous with the upper wall of said body, a body having a nose extended in front of the wing structure, a pair of motor nacelles secured in horizontal alignment to the sides of said nose and communicating with the interior of the body, a motor within each nacelle, propellers for said motors disposed in front of the nacelle and brought close together and in vertical alignment, a stream lined motor housing lying mainly in front of the main wing structure, and a common starting motor for the motors within the nacelles, said common starting motor being disposed within the nose of the body.

2. An airplane comprising a body and wing structure contiguous with the upper wall of said body, a body having a nose extended in front of the wing structure, a pair of motor nacelles secured in horizontal alignment to the sides of said nose and communicating with the interior of the body, a motor within each nacelle, propellers for said motors disposed in front of the nacelle and brought close together and in vertical alignment, a stream lined motor housing lying mainly in front of the main wing structure, a common starting motor for the motors within the nacelles, said common starting motor being disposed within the nose of the body, a clutch between each propeller and its motor, operating means for such clutches extending from said nacelles to the nose of the body and there connected with a common operating lever, said common operating lever being adapted by different motions thereof to release either clutch or both clutches simultaneously.

3. An airplane comprising a body and wing structure contiguous with the upper wall of said body, a body having a nose extended in front of the wing structure, a pair of motor nacelles secured in horizontal alignment to the sides of said nose and communicating with the interior of the body, a motor within each nacelle, propellers for said motors disposed in front of the nacelle and brought close together and in vertical alignment, a stream lined motor housing lying mainly in front of the main wing structure, a common starting motor for the motors within the nacelles, said common starting motor being disposed within the nose of the body, clutches between the propellers and motors of said nacelles, and operating means for such clutches extending from the said nacelles directly into the nose of said body and to a common operating lever, said operating lever being arranged so that by different motions thereof either clutch may be released or both may be released simultaneously.

4. An airplane containing, in combination with a stream lined fuselage tapering to the nose and tail both in plan and side view, and a wing structure secured thereto, of a pair of in-line motors lying in horizontal alignment one on each side of the center line of said fuselage and with crank cases displaced laterally outwardly from the sides of the fuselage and provided with propeller shafts, transverse motor supports extending outwardly from said fuselage and adjacent the nose thereof, propellers on said shafts disposed to have their revolving paths brought close together and in vertical alignment, stream-lined motor nacelles enclosing said motors, motor supports, and the motor accessories and lying at an elevation substantially below the wing structure.

5. An airplane containing, in combination with a stream lined fuselage tapering to the nose and tail in plan and side view, and a wing structure secured thereto, of a pair of in-line motors lying in horizontal alignment one on each side of the center line of said fuselage and with crank cases displaced laterally outwardly from the sides of the fuselage and the cylinders extending inwardly, said crank cases provided with propeller shafts, transverse motor supports extending outwardly from said fuselage and adjacent the nose thereof, propellers on said shafts disposed to have their revolving paths brought close together and in vertical alignment, stream-lined motor nacelles enclosing said motors, motor supports, and motor accessories and lying at an elevation substantially below the wing structure.

6. An airplane containing, in combination with a pisciform fuselage tapering to the nose and tail both in plan and side view, and a wing structure secured thereto, of a pair of in-line motors lying in horizontal alignment one on each side of the center line of said fuselage and with crank cases displaced laterally outwardly from the sides of the fuselage and provided with propeller shafts, transverse motor supports extending outwardly from said fuselage and adjacent the nose thereof, propellers on said shafts disposed to have their revolving paths brought close together and in vertical alignment, stream-lined motor nacelles enclosing said motors, motor supports, and the motor accessories and lying at an elevation substantially below the wing structure.

ALLAN H. LOUGHEAD.